United States Patent [19]

Kleinmann et al.

[11] Patent Number: 5,295,034
[45] Date of Patent: Mar. 15, 1994

[54] METHOD FOR THE OVERLOAD PROTECTION OF DEVICES WHICH CANNOT ENDURE CONTINOUS RUNNING ON ACCOUNT OF HEAT LOSS

[75] Inventors: Armin Kleinmann, Haigerloch; Josef Schumacher, Reutlingen, both of Fed. Rep. of Germany

[73] Assignee: Mercedes-Benz AG, Fed. Rep. of Germany

[21] Appl. No.: 769,795

[22] Filed: Oct. 2, 1991

[30] Foreign Application Priority Data

Oct. 15, 1990 [DE] Fed. Rep. of Germany ....... 4032612

[51] Int. Cl.$^5$ ............................................. H02H 7/08
[52] U.S. Cl. ...................................... 361/25; 361/103
[58] Field of Search ................... 361/103, 104, 25, 26, 361/27, 105, 106

[56] References Cited

U.S. PATENT DOCUMENTS 4,547,826 10/1985 Premerlani ............................ 361/25
4,982,143 1/1991 Gerschner ............................. 361/25

FOREIGN PATENT DOCUMENTS 0329926 1/1989 European Pat. Off. ....... H02H 5/04
3248217 12/1982 Fed. Rep. of Germany ......... H02H 5/04
2215148 2/1988 Fed. Rep. of Germany ......... H02H 7/085

Primary Examiner—A. D. Pellinen
Assistant Examiner—S. Jackson
Attorney, Agent, or Firm—Evenson, McKeown, Edwards & Lenahan

[57] ABSTRACT

A method for the overload protection of devices which cannot endure continuous running on account of heat loss, to avoid a complex, cost-intensive direct coupling of the device to be protected to a temperature measuring element. The inside temperature within the housing of the device is merely measured and, on the basis of device-specific characteristics stored in an evaluation circuit, a permissible operating period assigned to the inside temperature is calculated. The permissible operating period is then used as a basis for the preset operating period cycle time.

6 Claims, 2 Drawing Sheets

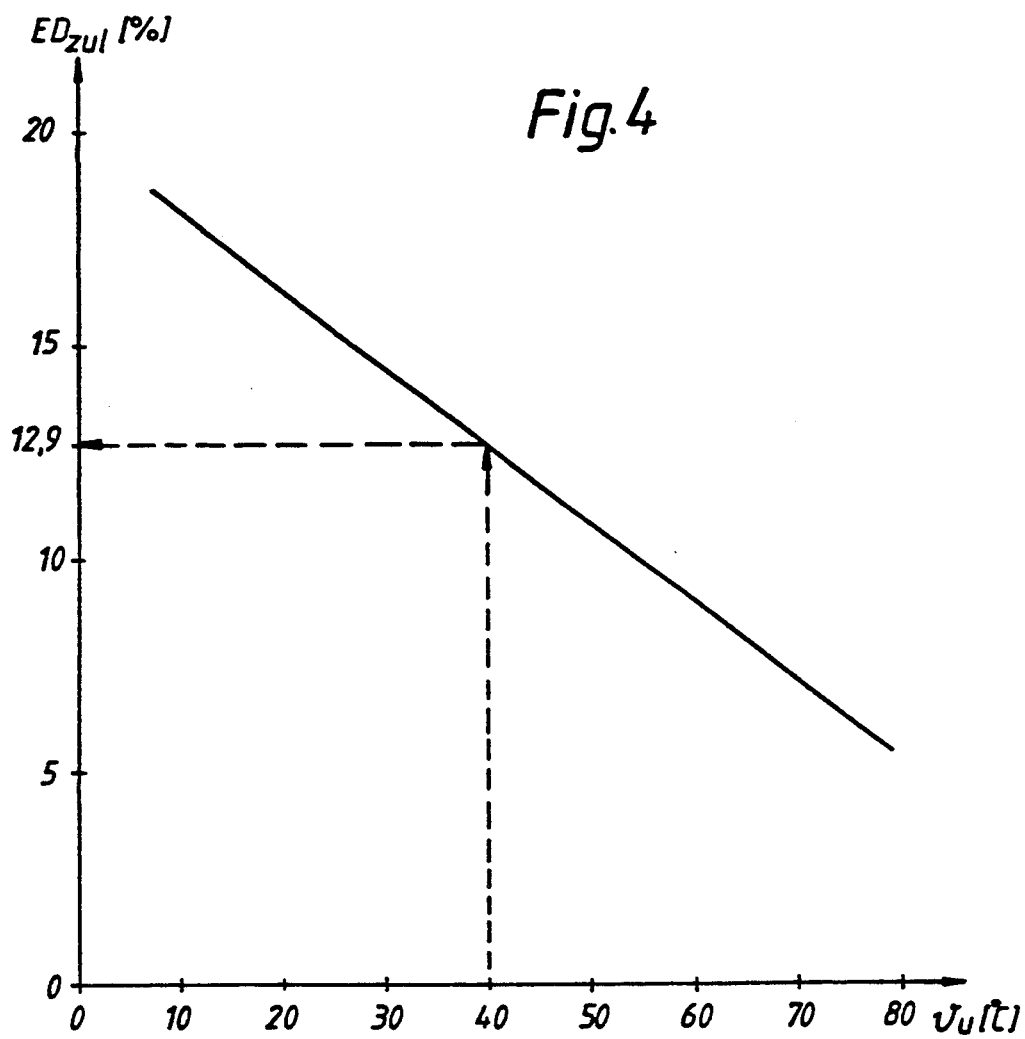
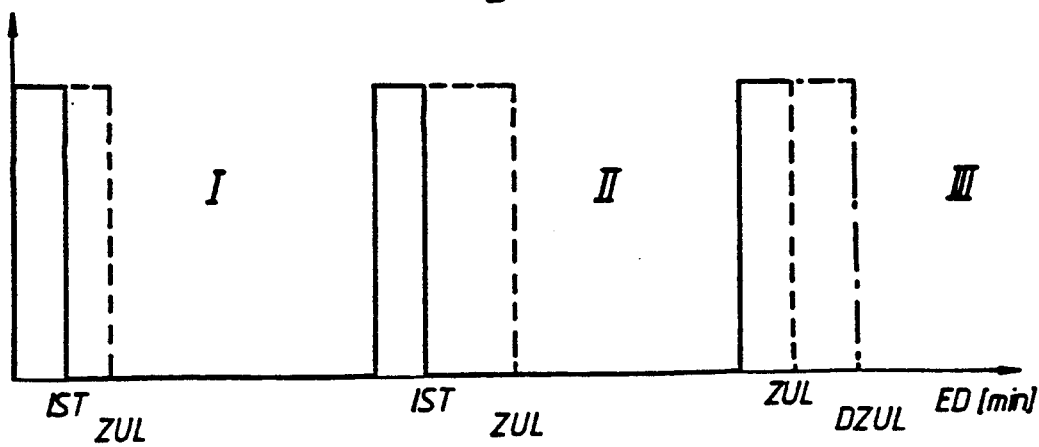

METHOD FOR THE OVERLOAD PROTECTION OF DEVICES WHICH CANNOT ENDURE CONTINOUS RUNNING ON ACCOUNT OF HEAT LOSS

BACKGROUND OF THE INVENTION

The present invention relates to a method for the overload protection of devices which cannot endure continuous running on account of heat loss, having a temperature-dependent resistor measuring the inside temperature of the device and having an evaluation circuit.

In the case of devices which may not be operated uninterruptedly, for example for reasons of heat development, an overloading of the devices must be prevented by suitable measures. For this purpose it is known from German Patent Document DE 32 48 217 A1 to measure the inside temperature of the device in the exhaust airstream of the device with a temperature-dependent resistor, which is part of an evaluation circuit and which, upon corresponding actuation, reduces the motor output to a lower value to avoid overheating.

Generally known measures for overload protection also comprise running time counters, bimetal switches or temperature measuring elements arranged directly in the device on its critical components reducing heat loss.

It may be considered disadvantageous in the case of these known measures that there is not optimum utilization of the devices—running time counter without reference to the temperature—or that there are high costs due to additional lines of the temperature measuring point and that the installation of a bimetal switch or a temperature measuring element directly in the device is complex.

An object of the invention is to provide a method for overload protection of devices which cannot endure continuous running on account of heat loss.

This and other objects are achieved by the present invention which provides a method for the overload protection of devices which cannot endure continuous running on account of heat loss, having a temperature-dependent resistor measuring the inside temperature of the device and having an evaluation circuit. The method includes measuring by means of the resistor arranged outside the device and remote from its device parts producing heat loss the inside temperature inside a housing enclosing the device. A temperature difference assigned to the inside temperature is read out from a device-specific characteristic stored in the evaluation circuit. The difference $T_u = \nu_u - \Delta T$ is then formed in a subtracter of the evaluation circuit. From a further device-specific characteristic stored in the evaluation circuit a permissible operating period of the device is read out. This permissible operating period is assigned to the temperature difference. A preset operating period cycle time is determined using the permissible operating period as the basis for a preset operating period cycle time. After reaching the permissible operating period, the device is turned off by the evaluation circuit during the operating period cycle time.

The objects are also achieved by another embodiment of the present invention which provides a method for the overload protection of devices which cannot endure continuous running on account of heat loss, having a temperature-dependent resistor measuring the inside temperature of the device and having an evaluation circuit. The method includes measuring by means of the resistor arranged outside the device and remote from its device parts producing heat loss the inside temperature inside a housing enclosing the device. From a device-specific characteristic stored in the evaluation circuit, which characteristic is derived from device-specific characteristics, a permissible operating period of the device that is assigned to the inside temperature is read out. The permissible operating period is used as the basis for determining a preset operating period cycle time. After reaching the permissible operating period, the device is turned off by the evaluation circuit during the operating period cycle time.

In particular, with the method of the present invention, the device is utilized optimally with respect to its operating period cycle time and also, there is no need for a cost-intensive, direct coupling of the temperature measuring element in the device to its critical components producing heat loss.

Other objects, advantages and novel features of the present invention will become apparent from the following detailed description of the invention when considered in conjunction with the accompanying drawings.

BRIEF DESCRIPTION OF THE DRAWINGS

FIG. 2 to FIG. 4 each show a device specific characteristic for use in the methods according to the present invention.

FIG. 5 shows an operating period cycle time diagram.

DETAILED DESCRIPTION OF THE DRAWINGS

Figure 1:
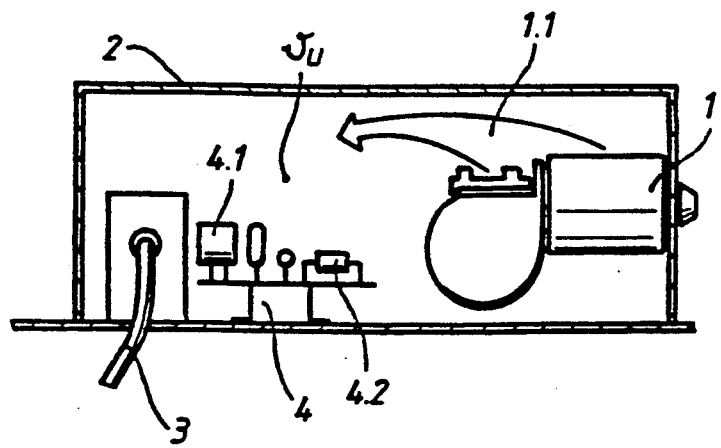
FIG. 1 shows a basic diagram of a device to be protected against overload.

As can be seen from FIG. 1, a device 1, for example an electrically driven pump, is enclosed by a housing 2, into which a power supply cable 3 leads and in which electrical circuity part 4 is arranged spatially separate from the device 1. The electrical circuitry part 4 is, for example, a circuit board fitted with electrical components. On this board, an evaluation circuit 4.1, designed for example as a microchip, and a temperature-sensitive resistor 4.2, electrically connected to the evaluation circuit 4.1, are arranged in such a way that it can sense the inside temperature in the housing on the basis of the waste heat 1.1 emanating from the device parts producing heat loss and filling the housing 2. A direct coupling of the resistor 4.2 to the device 1 is thus avoided.

Figure 2:
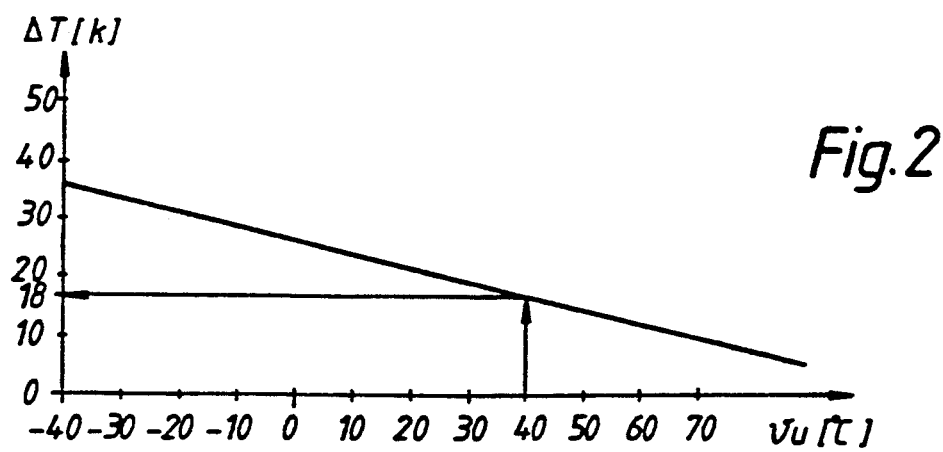
Figure 3:
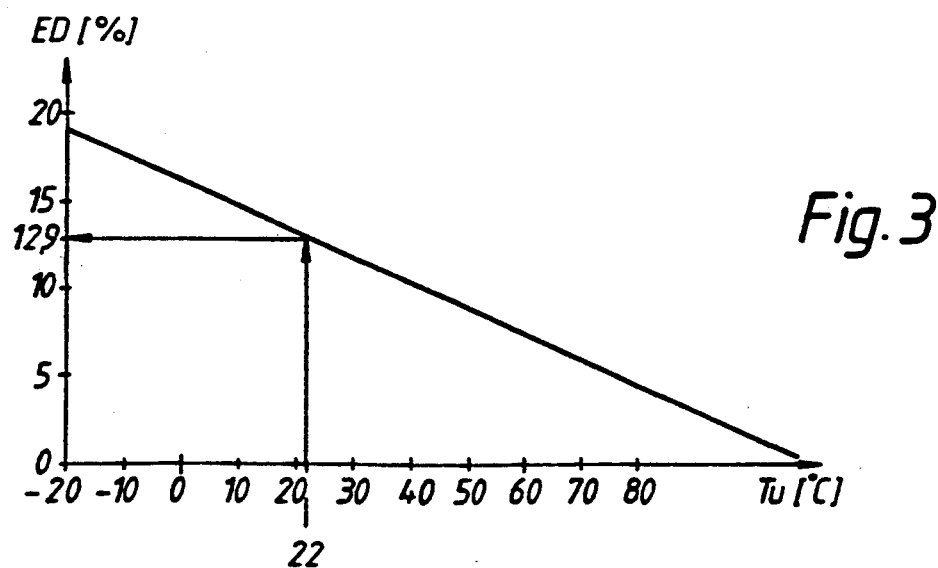

In the evaluation circuit 4.1 there are then two characteristics stored, namely a characteristic $\Delta T \ [K] = f(\nu [°C.])$ according to FIG. 2 and a characteristic $ED \ [\%] = f(T_u \ [°C.])$ according to FIG. 3, wherein:

$\nu_u$ = inside temperature in the housing 2
$\Delta T$ = temperature difference
$T_u$ = derived device temperature ($\nu_u - \Delta T$)
$ED$ = operating period of the device.

These characteristics were calculated in tests involving several identical devices and are thus device-specific. Characteristics of other types of devices can easily be calculated in tests.

The characteristic according to FIG. 2 hereby states the following: if, for example, an inside temperature $\nu_u = 40°$ C. is measured in the housing 2, this temperature is assigned a temperature difference $\Delta T = 18K$, which states that the heating in the housing 2 due to the operation of the device 1 is higher by this temperature difference $\Delta T$ than the temperature $T_u$ of the device 1 itself. In the evaluation circuit 4.1, therefore, the temperature difference $\Delta T$ (18K) assigned to the measured inside temperature $v_u$ (40° C.) is read out from this characteristic and then the difference ($v_u - \Delta T$), which corresponds to the derived device temperature $T_u$ (22° C.), is formed in a subtracter.

With this derived device temperature $T_u$, the permissible operating period $ED_{ZUL}$ of the device is then read out in the evaluation circuit from the other stored characteristic according to FIG. 3, in the example for $T_u = 22°$ C.$\rightarrow ED_{ZUL} = 12.9\%$, which is then used as the basis for a preset operating period cycle time (comprising working time and breaks) of, for example, 5 minutes, the device may be turned on by the evaluation circuit for only 0.65 minutes in order to ensure in this way that the limit temperature of the device (for example 110° C.) is not exceeded.

Instead of the characteristics according to FIGS. 2 and 3, in the evaluation circuit there may also be stored a characteristic $ED[\%] = f(v_u[°C.])$ according to FIG. 4, which characteristic is derived from the characteristic according to FIGS. 2 and 3 permits a direct assignment of the measured inside temperature $v_u$ to the operating period ED.

In order to allow optimally for the temporal influencing factors applying to the device 1 and the housing 2, according to the method of the present invention the operating period $ED_{ZUL}$ can be newly determined for each operating period cycle time, which can be realized in the evaluation circuit by a timing element set to the operating period cycle time.

In order to prevent use of the device 1 being adversely influenced by the effects of play or the like, that is to say to prevent the device being turned off although a critical temperature has not yet been reached on the device 1, the evaluation circuit 4 may, furthermore, be designed in such a way that the actual operating periods $ED_{IST}$ of at least two successive operating period cycle times I, II are measured in it. These actual operating periods $ED_{IST}$ are compared with a calculated average permissible operating period $ED_{ZUL}$ during the operating period cycle times, (see FIG. 5). If this comparison reveals that $ED_{IST} < ED_{DZUL}$, it is possible from the evaluation circuit for at least a following operating period cycle time III to increase correspondingly, for example double, the permissible operating period $ED_{ZUL}$ read out for this operating period cycle time.

Thus, it is evident that, with the method according to the invention, the device can be utilized optimally with regard to its permissible operating periods without complex, cost-intensive direct coupling of the device to be protected to a temperature measuring element.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for the overload protection of devices which cannot endure continuous running on account of heat loss, having a temperature-dependent resistor measuring the inside temperature of the device and having an evaluation circuit, comprising:

measuring by means of the resistor arranged outside the device and remote from its device parts producing heat loss the inside temperature $v_u$ inside a housing enclosing the device;

reading out a temperature difference $\Delta T$ assigned to the inside temperature $v_u$ from a device-specific characteristic stored in the evaluation circuit;

forming a difference $T_u = v_u - \Delta T$ in a subtracter of the evaluation circuit;

reading out from a further device-specific characteristic stored in the evaluation circuit a permissible operating period of the device, said permissible operating period being assigned to the temperature difference;

determining a preset operation period cycle time using said permissible operating period as the basis for a preset operating period cycle time; and after reaching the permissible operating period, turning off the device by the evaluation circuit during the operating period cycle time.

2. Method according to claim 1, wherein the operating period is determined for each operating period cycle time.

3. Method according to claim 2, wherein the actual operating periods of at least two successive operating cycle times are measured in the evaluation circuit and compared with a calculated average permissible operating period during the operating period cycle times and in that, if the actual operating period cycle times are less than the calculated average permissible operating period for at least a following operating period cycle time the permissible operating period read out for this operating period cycle time is correspondingly increased.

4. Method for the overload protection of devices which cannot endure continuous running on account of heat loss, having a temperature-dependent resistor measuring the inside temperature of the device and having an evaluation circuit, comprising:

measuring by means of the resistor arranged outside the device and remote from its device parts producing heat loss the inside temperature inside a housing enclosing the device;

reading out from a device-specific characteristic stored in the evaluation circuit, which characteristic is derived from device-specific characteristics, a permissible operating period of the device that is assigned to the inside temperature;

using the permissible operating period as the basis for determining a preset operating period cycle time; and after reaching the permissible operating period, turning off the device by the evaluation circuit during the operating period cycle time.

5. Method according to claim 4, wherein the operating period is determined for each operating period cycle time.

6. Method according to claim 5, wherein the actual operating periods of at least two successive operating cycle times are measured in the evaluation circuit and compared with a calculated average permissible operating period during the operating period cycle times and in that, if the actual operating period cycle times are less than the calculated average permissible operating period for at least a following operating period cycle time the permissible operating period read out for this operating period cycle time is correspondingly increased.

* * * * *